March 1, 1949. M. SERKES 2,463,209
ADJUSTABLE STRAINER
Filed Jan. 26, 1946
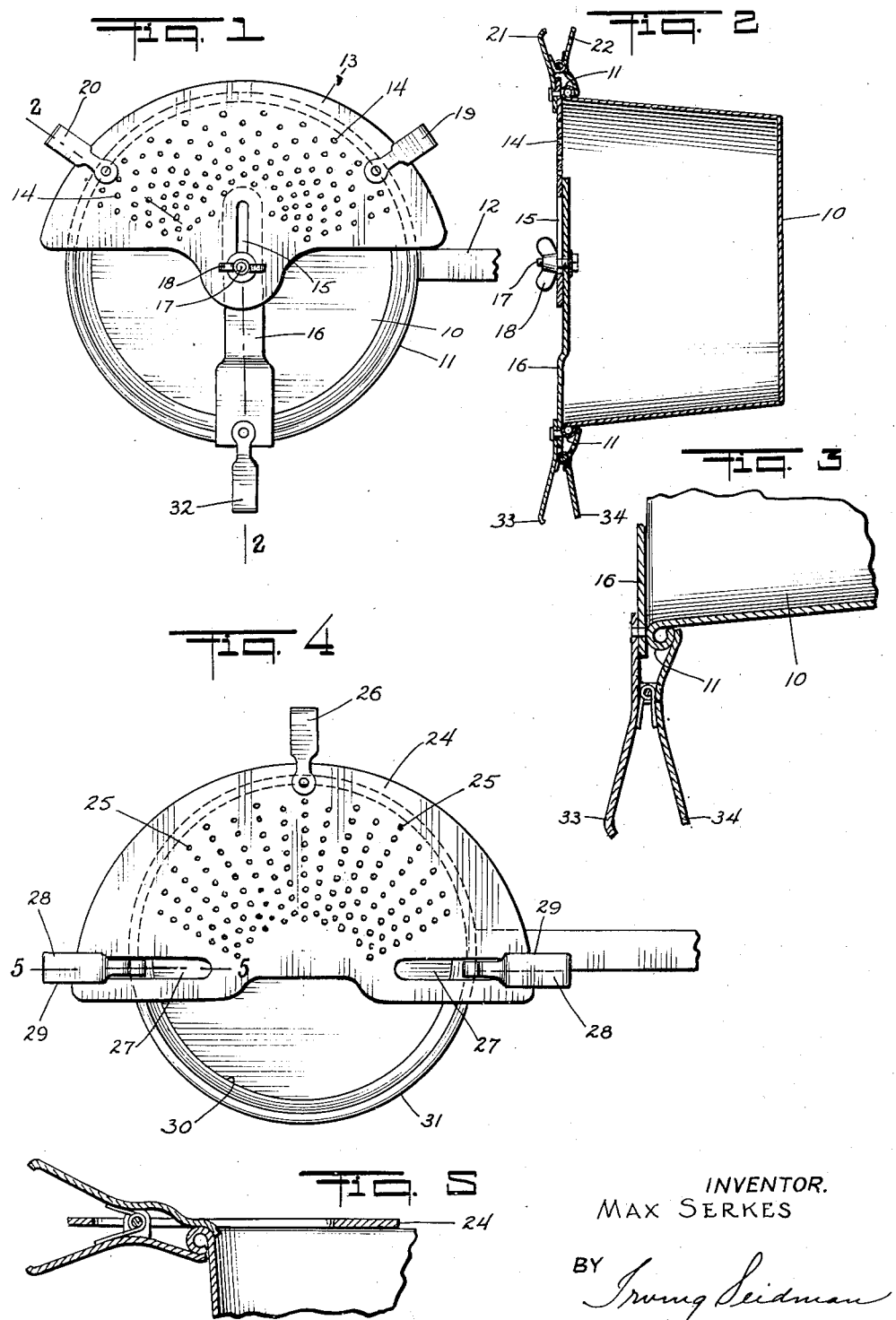
INVENTOR.
MAX SERKES
BY *Irving Seidman*
ATTORNEY Patented Mar. 1, 1949

2,463,209

UNITED STATES PATENT OFFICE 2,463,209

ADJUSTABLE STRAINER

Max Serkes, Bronx, N. Y.

Application January 26, 1946, Serial No. 643,707

2 Claims. (Cl. 210—163.5)

This invention relates to an adjustable strainer for attachment to pots, pans and the like.

Broadly, it is an object of my invention to provide a simple and practical strainer which may be easily and simply attached to a pan, pot, kettle or similar cooking utensil so that water may be drained therefrom without losing any of the contents within the vessel.

More particularly, it is an object of my invention to provide an inexpensive strainer having fixed and movable members for attachment to the edge of a utensil and which will fit a variety of sizes of utensils.

A further object of my invention is to provide a semi-circular strainer of comparatively flat shape with a perforated body which may be attached to the edge of a utensil and which is capable of being easily handled either with the right or left hand and which may be readily attached and detached from the vessel.

The strainer consists of certain novel features of construction, combinations and arrangements of parts and the drawings illustrate two features of the invention showing the application of the principles of my invention.

For a fuller understanding of the nature and objects of my invention, reference is had to the following detailed description in connection with the accompanying drawings, in which:

Figure 1 is a plan view of a strainer showing it attached to a pot.

Figure 2 is a section taken through line 2—2 of Figure 1.

Figure 3 is an enlarged sectional view taken through one clamp and the edge of the pot.

Figure 4 is a plan view of a modified strainer showing it attached to a pot.

Figure 5 is a section taken through line 5—5 of Figure 4.

Referring to the drawings, numeral 10 represents a pot having a flange 11 and a handle 12. The pot may be of any desired shape. I only illustrate a pot for the purpose of example, however, a pan, skillet, or other type of cooking utensil having a flange may be used.

Numeral 13 is a flat piece of metal, preferably aluminum, and approximately semi-circular in shape. Flat piece 13 has perforations 14, as shown in Figure 1. At the central portion of flat piece 13 there is a slot 15. Beneath the flat member 13 and the slot 15 there is a movable member 16 having a hole adjacent one end thereof. A bolt 17 threaded at the upper end is passed through the hole in member 16 and through the slot 15. A wing nut is seated upon bolt 17. Adjacent the edges of flat member 13 at two points as shown in Figure 1, there are attached clamps 19 and 20. These clamps may be attached by rivets, spot welding or other means. The upper portion 21 of these clamps is fixed, while the lower portion 22 is movable. A clamp 32 is attached to the movable member 16 at the extreme end, the upper portion 33 of which is fixed while the lower portion 34 is movable. In order to attach the strainer to the pot 10, clamps 19 and 20 are attached by compressing the ends of the clamps so that the flange 11 of the pot is firmly gripped by the clamps. The wing nut 18 is then loosened and the movable member 16 moved inwardly until the clamp 21 can be compressed and firmly fixed to the flange 11. The wing nut 18 is then tightened, thus firmly fixing the entire strainer upon the upper surface of the pot 10. The water may then be poured from the pot by tipping the pot in the direction of the flat member 13 which prevents the food or other solid matter from leaving the pot.

In order to remove the strainer from the pot, the wing nut 18 is loosened, the clamps 32 compressed and the movable member 16 slid outwardly. Clamps 19 and 20 are then compressed thus releasing the strainer from the flange 11 of the pot.

The housewife or cook may attach the strainer to the pot during the cooking process and since the strainer is comparatively flat, a cover may be placed directly upon the strainer during the cooking process, or the strainer may be applied at the time it is desired to pour the liquid from the pot as heretofore described.

Figure 4 shows a modified strainer having a flat metal plate 24 of substantially semi-circular shape with perforations 25. Adjacent the outer edge and centrally located is a fixed clamp 26, the upper portion of which is stationary and the lower portion movable. Approximately adjacent the diameter of the flat metal piece 24 are slots 27 within which movable clamps 28 are adapted to slide. The outer portions 29 are wider than the width of the slots 27 so that the clamps cannot fall out of the slots 27 and slide therein.

In order to fasten the strainer upon the pot 30 the flat member 24 is placed upon the upper edge of the flange 31 and the clamp 26 compressed so that the lower movable portion of the clamp 26 grips the flange 31 of the pot. Clamps 28 and 29 are then moved inwardly and compressed to grip flange 31.

The strainer as shown in Figures 1 and 4 may be attached to pots or other utensils of different diameters within limits.

The flat member 13 and 24 and the fixed and movable clamps may be made of aluminum, stainless steel, certain types of plastic and other materials.

It is obvious that various changes and modifications may be made in the details of construction without departing from the general spirit of the invention.

I claim:

1. A strainer of the character described comprising a main perforated body portion of substantially semi-circular shape, opposed slots substantially along the diameter of said main body portion, a fixed clamp attached adjacent the outer circumference of said main body portion adapted to grip the flange of a pot, movable clamps within said slots adapted to grip the flange of said pot whereby when said clamps are fixed to said flange of said pot said strainer will be firmly positioned upon said pot.

2. A strainer of the character described comprising a flat perforated main body portion of substantially semi-circular shape, a clamp fixed along the central outer part of said body portion, opposed slots substantially along the diameter of said body portion, clamps adapted to ride within said slots, said clamps adapted to grip the flange of a pot whereby when all of said clamps have been attached to the flange of said pot said strainer will be firmly fixed upon said pot.

MAX SERKES.

REFERENCES CITED

The following references are of record in the file of this patent:

UNITED STATES PATENTS

| Number | Name | Date |
|---|---|---|
| 1,916,710 | Alexander | July 4, 1933 |
| 1,928,851 | Devlin | Oct. 3, 1933 |
| 2,133,724 | Smulski | Oct. 18, 1938 |
| 2,398,978 | Udell | Apr. 23, 1946 |

FOREIGN PATENTS

| Number | Country | Date |
|---|---|---|
| 372,800 | Germany | Apr. 3, 1923 |